United States Patent [19]

Wasilczyk

[11] 4,067,831

[45] Jan. 10, 1978

[54] PROCESS FOR THE PREPARATION OF POLYURETHANE FOAMS

[75] Inventor: George J. Wasilczyk, Lake Jackson, Tex.

[73] Assignee: The Dow Chemical Company, Midland, Mich.

[21] Appl. No.: 581,174

[22] Filed: May 27, 1975

[51] Int. Cl.² .................... C08G 18/20; C08G 18/24
[52] U.S. Cl. .................... 260/2.5 AC; 260/2.5 AB; 260/77.5 AB; 260/77.5 AC
[58] Field of Search .................... 260/2.5 AB, 2.5 AC, 260/77.5 AB, 77.5 AC

[56] References Cited

U.S. PATENT DOCUMENTS

| | | | |
|---|---|---|---|
| 3,148,162 | 9/1964 | Gmitter et al. | 260/2.5 AB |
| 3,311,648 | 3/1967 | Herbstman et al. | 260/2.5 AB |
| 3,391,091 | 7/1968 | Considime et al. | 260/2.5 AB |
| 3,392,153 | 7/1968 | Hostettler et al. | 260/2.5 AB |
| 3,821,130 | 6/1974 | Barron et al. | 260/2.5 BD |
| 3,853,795 | 12/1974 | Jenkins et al. | 260/2.5 AC |
| 3,980,579 | 9/1976 | Syrop et al. | 260/2.5 AB |

*Primary Examiner*—Donald E. Czaja
*Assistant Examiner*—H. H. Fletcher
*Attorney, Agent, or Firm*—James G. Carter

[57] ABSTRACT

An improved process for the preparation of flexible polyurethane foams which comprise conducting the foaming in the presence of a delayed action catalyst and an inorganic filler having a pH 5 to 10, preferably 6 to 8, and an average particle size of 2–30 microns, preferably 5–15 microns. The process is suitable for slabstock and molded foams.

5 Claims, No Drawings

PROCESS FOR THE PREPARATION OF POLYURETHANE FOAMS

This invention is directed to a process for preparing flexible polyurethane foams.

Flexible polyurethane foams are conventionally prepared from polyols and polyisocyanates in the presence of amine catalysts and/or organo-metal catalysts and blowing agents.

It has now been discovered that one or more of the physical properties, such as, load bearing properties, i.e. compression set and/or 65% indentation load deflection, tear strength, and tensile strength can be improved by employing, in addition to the usual catalysts, a "delayed-action" catalyst and an inorganic filler.

The process of the present invention is particularly useful in the preparation of molded flexible polyurethane articles wherein not only are the load bearing and/or strength properties improved, but they are achieved sooner, permitting the articles to be removed from the molds earlier than normal therefore increasing the productivity rate for a given mold.

The process of the present invention is suitable for the preparation of flexible polyurethane slabstock foam in that an improvement in one or more of such properties as load bearing, compression set, tensile strength and tear strength are obtained.

The process of the present invention is also suitable for the preparation of highly resilient, flexible polyurethane foams without the requirement of a "crosslinker" compound such as 4,4'-methylene(bis)-2-chloroaniline or other suitable crosslinkers although a crosslinker may be used.

The process of the present invention is therefore directed to an improved process for preparing flexible polyurethane foams by reacting a polyol with a polyisocyanate in the presence of catalysts, foaming agents and cell control agents, the improvements which comprises employing as an additional catalyst, from about 0.001 to about 1.5, preferably from about 0.03 to about 0.12 parts per 100 parts of a polyol of a delayed action catalyst and as a filler, from about 5 to about 100 preferably from about 10 to about 50 parts by weight per 100 parts of polyol of an inorganic filler having a pH of from about 5 to about 10, preferably from about 6 to about 8, and an average particle size of from about 2 to about 30 microns, preferably from about 5 to about 15 microns.

Any polyol conventionally employed in the preparation of flexible polyurethane foams can be employed in the process of the present invention. These include either polyether polyols, polyester polyols or mixtures thereof. Such polyols are described in the literature such as *Polyurethanes: Chemistry and Technology, Parts I and II*, by Saunders and Frisch, Interscience.

Particularly suitable polyols include polyether polyols having 2 to 4 hydroxyl groups and an average molecular weight of from about 3000 to about 7000.

Any organic polyisocyanate conventionally employed in the preparation of flexible polyurethane foams can be employed in the process of the present invention and includes NCO-containing quasi-prepolymers prepared from polyols and polyisocyanates. Such polyisocyanates are described in the Saunders and Frisch publication mentioned above.

Particularly suitable polyisocyanates include for example. toluene diisocyanate, methylenediphenyl diisocyanate, and polymethylene polyphenylisocyanates.

Suitable blowing or foaming agents and cell control agents as well as amine and organo-metal catalysts are also described in the above mentioned Saunders and Frisch publication.

Particularly suitable amine catalysts include, for example, triethylenediamine, N-ethylmorpholine, N(dimethylaminoethyl)piperazine, N,N'-bis(dimethylaminoethyl)piperazine, tetramethyl butanediamine, dimethylethanolamine, bis(2-dimethylaminomethyl)ether, mixtures thereof and the like.

Suitable organo-metal catalysts include stannous octoate, dibutyltindilaurate and the like.

The term delayed action catalyst as employed herein for purposes of the present invention means that a mixture of the "delayed-action" catalyst, polyisocyanate and polyol and also the crosslinker or other components when desired, to be employed exhibits a $T_{\Delta\eta=1000}/T_{\Delta\eta=10000}$ value of $\geq 0.7$ where $T_{\Delta\eta=1000}$ is the time after admixture, in minutes required for said mixture to exhibit an increase in viscosity of 1000 cps × g/cc (hereinafter cpsxd) and $T_{\Delta\eta=10000}$ is the time, after admixture, in minutes required for said mixture to exhibit an increase in viscosity of 10000 cpsxd as determined on a Nametre Co. direct readout viscometer Model No. 7-006, serial no. 023.

Suitable delayed action catalysts include, for example, the reaction products of phenyl isocyanate with 2-methyl imidazole, imidazole, 2-methyl-4-phenyl imidazole, or 1-methyl imidazole; the reaction product of parachlorophenyl isocyanate with imidazole, 2-methyl imidazole, or 2-undecyl imidazole; the reaction product of paratoluene sulfonal isocyanate with 2-methyl imidazole or 2,4-dimethyl imidazole; the reaction product of 3,4-dichlorophenyl isocyanate with 2-methyl imidazole, 2,4-dimethyl imidazole or 2-ethyl-4-methyl imidazole; the reaction product of heptadecyl isocyanate with 2-methyl imidazole, or 2-ethyl-4-methyl imidazole.

These reaction products can readily be prepared by reacting the isocyanate with the imidazole in stoichiometric quantities at room temperature in the presence of an inert solvent such as dichloromethane and subsequently removing the solvent therefrom.

Other suitable delayed action catalysts which can be employed in the present invention include for example, such sulfur containing organo-tin compounds having a tin-sulfur bond as represented by the formula

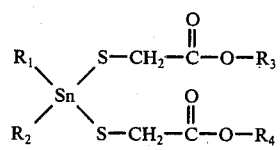

wherein $R_1$ and $R_2$ are independently selected from hydrocarbon groups having from 1 to about 8 carbon atoms and $R_3$ and $R_4$ are independently selected from hydrocarbon groups having from 1 to about 18 carbon atoms.

Such sulfur containing organo-tin compounds are commercially available from Argus Chemical Corp. as Markure UL-6, Markure UL-29, LRB-1355-331 and LRB-1355-383 and from M&T Chemicals as Thermolite 31.

Mixtures of suitable "delayed-action" catalysts may also be employed

Suitable fillers include silica, aluminum trihydrate, calcium carbonate, barium sulfate, carbon black, mica, titanium dioxide mixtures thereof and the like.

The foams prepared by the process of the present invention may also contain crosslinkers, fire retardant agents, polymers or copolymers of average molecular weight of at least about 5000 and preferably at least about 20,000 and the like.

The following examples are illustrative of the present invention and are not to be construed as limiting the scope thereof in any manner.

In each of the following examples and comparative experiments, the filler, where present, was thoroughly dispersed in the polyol and the remainder of the components except for the polyisocyanate was then blended with the polyol-filler dispersion. The polyisocyanate was then blended with the previous blend and the resultant foamable mixture poured into a suitable mold which was subsequently closed (molded foam) or open-container (slabstock foam). Table I provides Examples of molded foams and Table II provides Examples of slabstock foams. Table III provides the $T_{\Delta\eta=1000}/T_{\Delta\eta=10000}$ values for various catalysts employing the following composition:

100 parts by weight of polyol A
30 parts by weight of polyisocyanate A
0.6 parts by weight of diethanolamine (crosslinker)
0.05 parts by weight of the indicated catalyst
2.5 parts by weight of water The components employed in the examples and comparative experiments are designated as follows:

Polyol A was an adduct of glycerine with propylene oxide subsequently end-capped with about 14 wt. % ethylene oxide and having an average OH equivalent weight of about 1650.

Polyisocyanate A was an 80/20 mixture of 2,4-/2,6-toluenediisocyanate.

Catalyst A was a 33% solution of triethylenediamine in dipropylene glycol.

Catalyst B was a 70% solution of bis(2-dimethylaminoethyl)ether in dipropylene glycol.

Catalyst C was dibutyltin dilaurate.

Delayed Action Catalyst A was Markure UL-6, an organo-tin sulfide commercially available from Argus Chemical Corp.

Delayed Action Catalyst B was the reaction product of phenylisocyanate and 2-methylimidazole.

Filler A was an amorphous silica having a pH of 7.0 and an average particle size of about 10 microns commercially available from Illinois Minerals Co. as Imsil A10.

Filler B was a hydrated alumina having a pH of 10 and an average particle size of about 30 microns commercially available from Kaiser Chemicals as Kaiser H36.

Each of the foams were maintained at 70° F and 50% relative humidity for 7 days prior to testing.

TABLE I

| COMPONENTS, CONDITIONS & PROPERTIES | EXAMPLE 1 | COMP.EXPT. 1-A | COMP.EXPT. 1-B | COMP.EXPT. 1-C |
|---|---|---|---|---|
| Polyol, type/parts | A/100 | A/100 | A/100 | A/100 |
| Polyisocyanate, type/parts | A/30.9 | A/30.9 | A/30.9 | A/30.9 |
| Diethanolamine, parts | 0.6 | 0.6 | 0.6 | 0.6 |
| Water | 2.5 | 2.5 | 2.5 | 2.5 |
| Silicone cell control agent, parts | 0.03 | 0.03 | 0.03 | 0.03 |
| Catalyst, type/parts | A/0.64 B/0.10 C/0.05 | A/0.64 B/0.10 C/0.05 | A/0.64 B/0.10 C/0.05 | A/0.64 B/0.10 C/0.05 |
| Delayed action catalyst, type/parts | A/0.05 | A/0.05 | none | none |
| Filler, type/parts | A/40 | none | A/40 | none |
| Mold Temp., ° F | 130 | 130 | 130 | 130 |
| Demold time, minutes | 2 | 2 | 2 | 2 |
| Density, lbs/ft³ (g/cc) | 3.72 (0.06) | 2.37 (0.038) | 3.2 (0.051) | 2.54 (0.41) |
| Tensile, psi (Kg/cm²) | 19.7 (1.385) | 11.6 (0.815) | 16.2 (1.139) | 12.7 (0.893) |
| Elongation, % | 161 | 209 | 199 | 198 |
| Tear, lbs/in (Kg/cm) | 2.3 (0.411) | 1.71 (0.305) | 2.13 (0.38) | 1.67 (0.298) |
| Resiliency, % | 65 | 59 | 66 | 60 |
| Compression Set, 75% CD, % | 5.7 | 8.6 | 4.6 | 10.3 |
| ILD, 25% | 49.4 | 15.4 | 29.2 | 15.2 |
| 65% | 130.8 | 44.0 | 78.8 | 45.4 |
| Modulus | 2.65 | 2.6 | 2.7 | 2.99 |

| COMPONENTS, CONDITIONS & PROPERTIES | EXAMPLE 2 | COMP.EXPT. 2-A | COMP.EXPT. 2-B | COMP.EXPT. 2-C |
|---|---|---|---|---|
| Polyol, type/parts | A/100 | A/100 | A/100 | A/100 |
| Polyisocyanate, type/parts | A/30.9 | A/30.9 | A/30.9 | A/30.9 |
| Diethanolamine, parts | 0.6 | 0.6 | 0.6 | 0.6 |
| Water | 2.5 | 2.5 | 2.5 | 2.5 |
| Silicone cell control agent, parts | 0.03 | 0.03 | 0.03 | 0.03 |
| Catalyst, | | | | |

TABLE I-continued

| | | | | |
|---|---|---|---|---|
| type/parts | A/0.64<br>B/0.10<br>C/0.05 | A/0.64<br>B/0.10<br>C/0.05 | A/0.64<br>B/0.10<br>C/0.05 | A/0.64<br>B/0.10<br>C/0.05 |
| Delayed action catalyst, | | | | |
| type/parts | A/0.05 | A/0.05 | none | none |
| Filler, | | | | |
| type/parts | A/40 | none | A/40 | none |
| Mold Temp., °F | 130 | 130 | 130 | 130 |
| Demold time, minutes | 3 | 3 | 3 | 3 |
| Density, lbs/ft³ | 3.47 | 2.42 | 3.22 | 2.36 |
| (g/cc) | (0.056) | (0.038) | (0.038) | (0.038) |
| Tensile, psi | 18.2 | 13.3 | 16.2 | 12.9 |
| (Kg/cm²) | (1.279) | (0.935) | (1.139) | (0.907) |
| Elongation, % | 178 | 213 | 189 | 219 |
| Tear, lbs/in | 2.7 | 1.74 | 2.23 | 1.65 |
| (Kg/cm) | (0.482) | (0.311) | (0.398) | (0.295) |
| Resiliency, % | 61 | 61 | 62 | 62 |
| Compression Set, 75% CD, % | 7.0 | 26.4 | 6.7 | 10.3 |
| ILD, 25% | 42.4 | 13.2 | 33.0 | 17.8 |
| 65% | 111.6 | 38.8 | 89.4 | 48.4 |
| Modulus | 2.63 | 2.94 | 2.71 | 2.72 |

| COMPONENTS, CONDITIONS & PROPERTIES | EXAMPLE 3 | COMP.EXPT. 3-A | COMP.EXPT. 3-B | COMP.EXPT. 3-C |
|---|---|---|---|---|
| Polyol, type/parts | A/100 | A/100 | A/100 | A/100 |
| Polyisocyanate, type/parts | A/30.9 | A/30.9 | A/30.9 | A/30.9 |
| Diethanolamine, parts | 0.6 | 0.6 | 0.6 | 0.6 |
| Water | 2.5 | 2.5 | 2.5 | 2.5 |
| Silicone cell control agent, parts | 0.03 | 0.03 | 0.03 | 0.03 |
| Catalyst, type/parts | A/0.64<br>B/0.10<br>C/0.05 | A/0.64<br>B/0.10<br>C/0.05 | A/0.64<br>B/0.10<br>C/0.05 | A/0.64<br>B/0.10<br>C/0.05 |
| Delayed action catalyst, type/parts | A/0.05 | A/0.05 | none | none |
| Filler, type/parts | A/40 | none | A/40 | none |
| Mold Temp., °F | 130 | 130 | 130 | 130 |
| Demold time, minutes | 4 | 4 | 4 | 4 |
| Density, lbs/ft³ | 3.46 | 2.75 | 3.57 | 2.86 |
| (g/cc) | (0.056) | (0.044) | (0.057) | (0.046) |
| Tensile, psi | 17.1 | 13.7 | 16.6 | 15.7 |
| (Kg/cm²) | (1.202) | (0.963) | (1.167) | (1.104) |
| Elongation, % | 183 | 201 | 165 | 185 |
| Tear, lbs/in | 2.58 | 2.16 | 2.54 | 1.99 |
| Kg/cm | (0.461) | (0.386) | (0.454) | (0.355) |
| Resiliency, % | 62 | 55 | 63 | 51 |
| Compression Set, 75% CD, % | 6.3 | 8.8 | 6.0 | 9.3 |
| ILD, 25% | 42.2 | 23.2 | 42.8 | 24.8 |
| 65% | 112.4 | 61.8 | 110.2 | 65.6 |
| Modulus | 2.66 | 2.66 | 2.57 | 2.65 |

| COMPONENTS, CONDITIONS & PROPERTIES | EXAMPLE 4 | COMP.EXPT. 4-A | COMP.EXPT. 4-B | COMP.EXPT. 4-C |
|---|---|---|---|---|
| Polyol, type/parts | A/100 | A/100 | A/100 | A/100 |
| Polyisocyanate, type/parts | A/30.9 | A/30.9 | A/30.9 | A/30.9 |
| Diethanolamine, parts | 0.6 | 0.6 | 0.6 | 0.6 |
| Water | 2.5 | 2.5 | 2.5 | 2.5 |
| Silicone cell control agent, parts | 0.03 | 0.03 | 0.03 | 0.03 |
| Catalyst, type/parts | A/0.64<br>B/0.10<br>C/0.05 | A/0.64<br>B/0.10<br>C/0.05 | A/0.64<br>B/0.10<br>C/0.05 | A/0.64<br>B/0.10<br>C/0.05 |
| Delayed action catalyst, type/parts | A/0.05 | A/0.05 | none | none |
| Filler, type/parts | A/40 | none | A/40 | none |
| Mold Temp., °F | 130 | 130 | 130 | 130 |
| Demold time, minutes | 5 | 5 | 5 | 5 |
| Density, lbs/ft³ | 3.54 | 2.84 | 3.57 | 2.79 |
| (g/cc) | (0.057) | (0.045) | (0.057) | (0.045) |
| Tensile, psi | 17.3 | 14.8 | 17.0 | 13.9 |
| (Kg/cm²) | (1.216) | (1.04) | (1.195) | (0.977) |
| Elongation, % | 175 | 195 | 152 | 196 |

TABLE I-continued

| | | | | |
|---|---|---|---|---|
| Tear, lbs/in | 2.47 | 1.89 | 2.51 | 2.01 |
| (Kg/cm) | (0.441) | (0.337) | (0.448) | (0.359) |
| Resiliency, % | 59 | 65 | 60 | 55 |
| Compression Set, | | | | |
| 75% CD, % | 5.4 | 9.9 | 6.4 | 9.6 |
| ILD, 25% | 45.4 | 22.8 | 45 | 22.2 |
| 65% | 120 | 74.8 | 118 | 71 |
| Modulus | 2.64 | 3.28 | 2.62 | 3.2 |

| COMPONENTS, CONDITIONS & PROPERTIES | EXAMPLE 5 | COMP.EXPT. 5-A | COMP.EXPT. 5-B | COMP.EXPT. 5-C |
|---|---|---|---|---|
| Polyol, | | | | |
| type/parts | A/100 | A/100 | A/100 | A/100 |
| Polyisocyanate, | | | | |
| type/parts | A/30.9 | A/30.9 | A/30.9 | A/30.9 |
| Diethanolamine, | | | | |
| parts | 0.6 | 0.6 | 0.6 | 0.6 |
| Water | 2.5 | 2.5 | 2.5 | 2.5 |
| Silicone cell control agent, | | | | |
| parts | 0.03 | 0.03 | 0.03 | 0.03 |
| Catalyst, | | | | |
| type/parts | A/0.64 | A/0.64 | A/0.64 | A/0.64 |
| | B/0.10 | B/0.10 | B/0.10 | B/0.10 |
| | C/0.05 | C/0.05 | C/0.05 | C/0.05 |
| Delayed action catalyst, | | | | |
| type/parts | A.0.05 | A/0.05 | none | none |
| Filler, | | | | |
| type/parts | A/40 | none | A/40 | none |
| Mold Temp., °F | 130 | 130 | 130 | 130 |
| Demold time, | | | | |
| minutes | 6 | 6 | 6 | 6 |
| Density, lbs/ft$^3$ | 3.24 | 2.47 | 3.3 | 2.4 |
| (g/cc) | (0.052) | (0.04) | (0.053) | (0.038) |
| Tensile, psi | 16.5 | 13.1 | 14 | 12.2 |
| (Kg/cm$^2$) | (1.16) | (0.921) | (0.984) | (0.858) |
| Elongation, % | 175 | 193 | 139 | 202 |
| Tear, lbs/in | 2.42 | 1.70 | 1.89 | 2.0 |
| (Kg/cm) | (0.432) | (0.304) | (0.337) | (0.357) |
| Resiliency, % | 62 | 60 | 64 | 59 |
| Compression Set, | | | | |
| 75% CD, % | 5.4 | 31.4 | 5.1 | 33.1 |
| ILD, 25% | 34.6 | 15 | 39.2 | 14.4 |
| 65% | 92.6 | 44.2 | 98.2 | 40.2 |
| Modulus | 2.68 | 2.95 | 2.51 | 2.79 |

| COMPONENTS, CONDITIONS & PROPERTIES | EXAMPLE 6 | EXAMPLE 7 |
|---|---|---|
| Polyol, | | |
| type/parts | A/100 | A/100 |
| Polyisocyanate, | | |
| type/parts | A/30.9 | A/30.9 |
| Diethanolamine, | | |
| parts | 0.6 | 0.6 |
| Water | 2.5 | 2.5 |
| Silicone cell control agent, | | |
| parts | 0.03 | 0.03 |
| Catalyst, | | |
| type/parts | A/0.6 | A/0.6 |
| | B/0.1 | B/0.1 |
| | C/0.05 | C/0.05 |
| Delayed action catalyst, | | |
| type/parts | B/0.1 | A/0.05 |
| Filler, | | |
| type/parts | A/40 | B/67 |
| Mold Temp., °F | 130 | 130 |
| Demold time, | | |
| minutes | 3 | 3 |
| Density, lbs/ft$^3$ | 3.62 | 4.27 |
| (g/cc) | (0.058) | (0.068) |
| Tensile, psi | 14.5 | 13 |
| (Kg/cm$^2$) | (1.019) | (0.914) |
| Elongation, % | 158 | 169 |
| Tear, lbs/in | 1.95 | 1.72 |
| (Kg/cm) | (0.348) | (0.307) |
| Resiliency, % | 58 | 63 |
| Compression Set, | | |
| 75% CD, % | 6.8 | 5.6 |
| ILD, 25% | 35 | 47 |
| 65% | 95.6 | 120.4 |
| Modulus | 2.73 | 2.56 |

TABLE II

| COMPONENTS, CONDITIONS & PROPERTIES | EXAMPLE 8 | COMP.EXPT. 8-A | COMP.EXPT. 8-B | COMP.EXPT. 8-C |
| --- | --- | --- | --- | --- |
| Polyol, type/parts | A/700 | A/700 | A/700 | A/700 |
| Polyisocyanate, type/parts | A/230 | A/230 | A/230 | A/230 |
| Diethanolamine, parts | 3.0 | 3.0 | 3.0 | 3.0 |
| Water | 18.9 | 18.9 | 18.9 | 18.9 |
| Silicone cell control agent, parts | 0.21 | 0.21 | 0.21 | 0.21 |
| Catalyst, type/parts | A/4.5 B/0.7 C/0.25 | A/4.5 B/0.7 C/0.25 | A/4.5 B/0.7 C/0.25 | A/4.5 B/0.7 C/0.25 |
| Delayed action catalyst, type/parts | A/0.35 | none | A/0.35 | none |
| Filler, type/parts | A/280 | A/280 | none | none |
| Density, lbs/ft$^3$ (g/cc) | 2.82 (0.045) | 2.78 (0.045) | 2.01 (0.032) | 2.07 (0.033) |
| Tensile, psi (Kg/cm$^2$) | 17.2 (1.209) | 15.6 (1.097) | 15.5 (1.09) | 14.4 (1.012) |
| Elongation, % | 188 | 136 | 271 | 240 |
| Tear, lbs/in (Kg/cm) | 2.12 (0.379) | 1.67 (0.298) | 2.07 (0.37) | 2.1 (0.375) |
| Resiliency, % | 58 | 56 | 48 | 54 |
| Compression Set, 75% CD, % | 6.1 | 11.8 | 24.3 | 16.0 |
| ILD, 25% | 25.4 | 26.4 | 11.0 | 12.2 |
| 65% | 62.2 | 72.0 | 28.6 | 23.8 |
| Modulus | 2.45 | 2.73 | 2.60 | 1.95 |

TABLE III

| Catalyst | $T_{\Delta\eta\,1000}/T_{\Delta\eta\,10000}$ |
| --- | --- |
| Delayed action catalyst A | 0.760 |
| Delayed action catalyst B | 0.798 |
| 2-methylimidazole | 0.641 |
| stannous octoate | 0.664 |
| catalyst A | 0.682 |
| N-ethylmorpholine | 0.634 |

I claim:

1. In a process for preparing flexible polyurethane foams by reacting a polyol with a polyisocyanate in the presence of a foaming agent, a cell control agent and catalysts, the improvement which comprises conducting the reaction additionally in the presence of (1) from about 0.001 to about 1.5 parts per 100 parts of polyol of a delayed action catalyst having a $T_{\Delta\eta 1000}/T_{\Delta\eta 10000}$ value of at least 0.7 as measured on a mixture of the polyol, polyisocyanate and delayed action catalyst components and when employed, crosslinker and water at an initial mixing temperature of about room temperature and (2) an inorganic filler having a pH of 5 to 10 and an average particle size of from about 2 microns to about 30 microns.

2. The process of claim 1 wherein said inorganic filler has a pH of from about 6 to about 8 and an average particle size of from about 5 microns to about 15 microns.

3. The process of claim 2 wherein the delayed action catalyst is present in quantities of from about 0.03 to about 0.12 parts per 100 parts of polyol and the filler is employed in quantities of from about 5 to about 100 parts per 100 parts of polyol.

4. The process of claim 3 wherein the delayed action catalyst is a sulfur containing organo-tin compound or the reaction product of phenylisocyanate with 2-methylimidazole.

5. The process of claim 4 wherein the filler is an amorphous silica or a hydrated alumina.

* * * * *